United States Patent
Takizawa et al.

(10) Patent No.: US 6,530,665 B2
(45) Date of Patent: *Mar. 11, 2003

(54) PROJECTOR

(75) Inventors: Takeshi Takizawa, Suwa (JP); Mutsuya Furuhata, Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/375,358

(22) Filed: Aug. 17, 1999

(65) Prior Publication Data

US 2002/0030792 A1 Mar. 14, 2002

(30) Foreign Application Priority Data

Aug. 27, 1998 (JP) .......................... 10-242356

(51) Int. Cl.$^7$ .............................................. G03B 21/14
(52) U.S. Cl. ........................................ 353/119; 349/58
(58) Field of Search ............................. 353/52, 81, 119, 353/31, 33; 349/58, 60

(56) References Cited

U.S. PATENT DOCUMENTS

| | | | |
|---|---|---|---|
| 4,950,072 A | * | 8/1990 | Honda ........................ 353/122 |
| 4,952,925 A | * | 8/1990 | Haastert ....................... 353/60 |
| 5,212,573 A | | 5/1993 | Yamazaki |
| 5,260,730 A | | 11/1993 | Williams et al. |
| 5,508,834 A | | 4/1996 | Yamada et al. |
| 5,743,611 A | * | 4/1998 | Yamaguchi et al. .......... 353/31 |
| 5,772,300 A | * | 6/1998 | Kitai ............................ 353/57 |
| 5,842,761 A | * | 12/1998 | Futakami et al. ............ 353/119 |
| 5,865,521 A | | 2/1999 | Hashizume et al. |
| 5,868,485 A | | 2/1999 | Fujimori et al. |
| 5,936,600 A | * | 8/1999 | Ohashi et al. ................ 345/87 |
| 6,053,616 A | * | 4/2000 | Fujimori et al. ............ 353/119 |
| 6,067,133 A | * | 5/2000 | Niibori et al. ................ 349/60 |

FOREIGN PATENT DOCUMENTS

| | | |
|---|---|---|
| EP | 0 768 556 A | 4/1997 |
| EP | 0769 714 A | 4/1997 |
| EP | 0 916 988 A1 | 5/1999 |
| JP | 63-160594 | 10/1988 |
| JP | 3-28823 | 2/1991 |
| JP | 6-258637 | 9/1994 |
| JP | 7-26223 | 1/1995 |
| JP | 7-262432 | 10/1996 |
| JP | 8-262432 | 10/1996 |
| JP | 9-105901 | 4/1997 |
| JP | 9-113906 | 5/1997 |
| JP | 10-133180 | 5/1998 |
| JP | 10-133196 | 5/1998 |

* cited by examiner

Primary Examiner—William Dowling
(74) Attorney, Agent, or Firm—Oliff & Berridge, PLC

(57) ABSTRACT

A projector prevents deterioration in optical characteristics of liquid crystal panels caused by heat generated by polarizers, and sticking of dirt onto the light-outgoing surface of the liquid crystal panels. Polarizers are disposed adjacent to the light-outgoing surfaces of liquid crystal panels, while other polarizers are disposed adjacent to the light-incoming surfaces of the liquid crystal panels. The liquid crystal panels and the two polarizers disposed adjacent to the light-incoming and light-outgoing surface of their corresponding liquid crystal panels, are supported by dust protection members. The area between the light-incoming surface of each liquid crystal panel and its associated polarizer disposed adjacent to the light-incoming surface, and the area between the light-outgoing surface of each liquid crystal panel and its associated polarizer disposed adjacent to the light-outgoing surface thereof are cut off from the outside by the dust protection member associated thereto. By virtue of this structure, it is possible to prevent deterioration in the optical characteristics of each liquid crystal panel, and to prevent dirt from sticking onto the light-outgoing surface of each light valve. Therefore, a high quality image with excellent contrast can be projected.

6 Claims, 13 Drawing Sheets

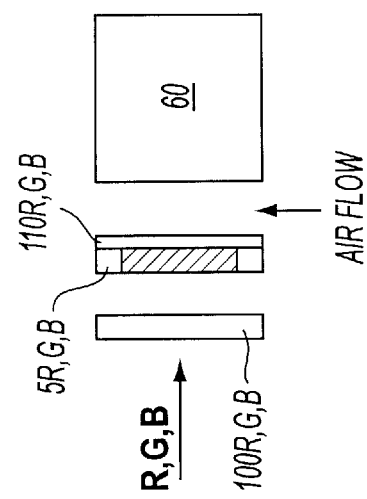
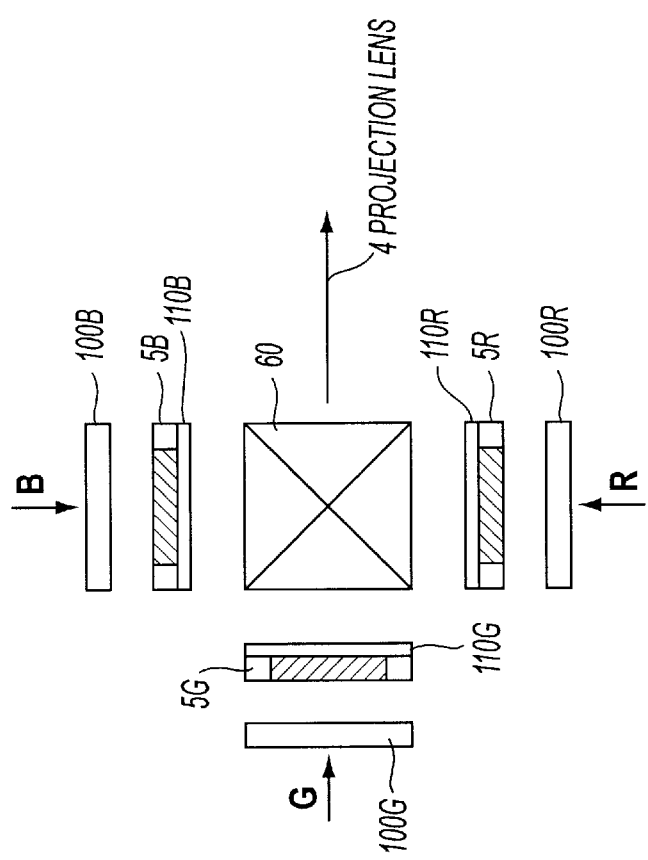
FIG. 14(C)
FIG. 14(B)

PROJECTOR

BACKGROUND OF THE INVENTION

1. Field of Invention

The present invention relates to a projector for projecting a modulated light in enlarged form on a projection screen through a projecting means as a result of modulating light from a light source by a light modulating element in accordance with image information.

2. Description of Related Art

A projector primarily comprises a light source unit; an optical unit for optically treating the light from the light source unit so as to synthesize color images in accordance with image information; and a projection lens for projecting in enlarged form the synthesized light onto a screen.

FIG. 14(A) is a schematic structural view of the optical unit and the projection lens. As shown in this figure, the optical system of the optical unit 3 comprises a light source 20 included in a light source unit; a color separation optical system 40 for separating a light W, emitted from the light source 20, into the three primary color light beams, namely, the red light beams (R), the green light beams (G), and the blue light beams (B); three liquid crystal panels (light modulating elements) 5R, 5G, and 5B, for modulating each of the different color light beams in accordance with image information; a cross dichroic prism 60 for combining each of the modulated color light beams; and a projection lens 4 for projecting in enlarged form the synthesized light onto a screen 120. The light W, emitted from the light source 20, is separated into the respective color light beams, R, G, and B, by the color separation optical system 40 comprising various dichroic mirrors. Of the color light beams, the red light beams R and the green light beams G are directed towards corresponding liquid crystal panels 5R and 5G from their corresponding light-outgoing portions in the color separation optical system 40. The blue light beams B are guided towards the liquid crystal panel 5B via a light-guiding optical system 50.

In the optical unit 3 illustrated in enlarged form in FIGS. 14(B) and 14(C), polarizers 100R, 100G, and 100B are disposed adjacent to the light-incoming surface of corresponding liquid crystal panels 5R, 5G, and 5B. The polarizers 100R, 100G, and 100B are provided to align the polarization planes of the different color light beams incident upon the corresponding liquid crystal panels 5R, 5G, and 5B. Polarizers 110R, 110G, and 110B are disposed at the light-outgoing side of the corresponding liquid crystal panels 5R, 5G, and 5B. The polarizers 110R, 110G, and 110B are provided to align the polarization planes of the different modulated color light beams that are going to strike the cross dichroic prism 60. The polarizers allow an image with high contrast to be projected onto the screen 120. Of the polarizers sandwiching their corresponding liquid crystal panels 5R, 5G, and 5B, the polarizers 110R, 110G, and 110B positioned at the light-outgoing surface side of the liquid crystal panels are adhered to the light-outgoing surface of their corresponding liquid crystal panels.

A generally used polarizer consists of a polarizer and a protective layer laminated thereto, with the polarizer formed of a dichroic material such as an iodine-containing material or organic dye. For the liquid crystal panels, an active matrix type liquid crystal device is generally used, in which type of liquid crystal device the pixels disposed in a matrix arrangement are controlled by a switching element.

Here, an effective way of increasing contrast of the image projected in enlarged form onto the screen 120 is to adhere a polarizer with good polarization selection characteristics to the light-outgoing surface of each of the liquid crystal panels 5R, 5G, and 5B. However, polarizers with excellent selection characteristics correspondingly absorb a larger amount of light, so that a large amount of heat is generated thereat. The above-described projector is constructed so that the polarizers are cooled by air currents formed in the projector, as shown in FIG. 14(C). However, since the polarizers are directly adhered to the light-outgoing surface of their respective liquid crystal panels, the liquid crystal panels transmit heat easily, so that the temperature of the liquid crystal panels tends to rise. This temperature rise deteriorates optical characteristics of the liquid crystal panels, reducing contrast of the projected image.

A possible solution to this problem is to dispose the polarizers so that they are separated from the light-outgoing surface of their respective liquid crystal panels. However, when the polarizers are merely separated from their respective light-outgoing surfaces, dust or the like sticks onto the light-outgoing surface of the liquid crystal panels by the air currents flowing in the device, causing a reduction in the quality of the projected image.

SUMMARY OF THE INVENTION

In view of the above-described problems, it is an object of the present invention to provide a projector which can project a high quality image, without deteriorating the optical characteristics of the light modulating elements and without allowing sticking of dust or the like onto the light-outgoing surface of the light modulating elements.

To overcome the above-described problems, according to the present invention, there is provided a projector comprising a light-modulating element for modulating light emitted from a light source in accordance with image information, and projecting means for projecting the light modulated by the light modulating element in enlarged form onto a projection surface;

wherein a polarizer is disposed adjacent to the light-outgoing surface side of the light-modulating element, and a dust protection member is provided so as to cut off from the outside the area between the polarizer and the light-outgoing surface of the light-modulating element.

In the projector of the present invention, a dust protection member is provided so as to cut off from the outside the area between the polarizer and the light-outgoing surface of the light-modulating element, thus forming an air layer between the polarizer and the light-outgoing surface. Therefore, the amount of heat generated at the polarizer and transmitted to the light-modulating element is reduced by the air layer. Consequently, even when a polarizer with excellent selection characteristics is used, the amount by which temperature of the light-modulating element rises by heat generated at the polarizer can be reduced, thereby obviating the problem of deterioration in the optical characteristics of the light-modulating element.

The area between the polarizer and the light-modulating element is cut off from the outside, so that even when dust or the like is scattered by air currents produced in the display interior, the dust does not enter into the area therebetween. Therefore, it is possible to eliminate the problem of dust or the like sticking onto the light-outgoing surface of the light-modulating element.

Accordingly, the projector of the present invention can project a high quality image with excellent contrast onto a projection surface, without deteriorating the optical characteristics of the light-modulating element and without allowing dirt to stick onto the light-outgoing surface of the light-modulating element.

When a polarizer is also disposed at the light-incoming surface of the light-modulating element, it is preferable to cut off from the outside the area between the polarizer and the light-incoming surface of the light-modulating element with the dust protection member. The dust protection member can prevent dirt from sticking onto the light-incoming surface of the light-modulating element, and is effective in allowing projection of a high quality image.

When a transparent plate is disposed between the light-incoming surface of the light-modulating element and the polarizer disposed adjacent to the light-incoming surface, it is desirable to cut off from the outside the area between the transparent plate and the light-incoming surface of the light-modulating element by the dust protection member. When the dust protection member is provided, the air layer between the transparent plate and the light-modulating element, and the transparent plate are interposed between the polarizer and the light-modulating element, so that the amount of heat generated at the polarizer (disposed adjacent to the light-incoming surface of the light-modulating element) and transmitted to the light-modulating element can be reduced. In addition, it is possible to prevent dust from sticking onto the light-incoming surface of the light-modulating element.

When dust or the like tends to stick onto the light-incoming surface of the light-modulating element by, for example, air currents generated in the device, a dust protection member can be used to cut off from the outside the area between the polarizer and the light-incoming surface of the light-modulating element.

Not only can a commonly used polarizer be of the type which transmits one type of polarized light and absorbs the other type of polarized light. It can also be a reflective type polarizer which reflects the other type of polarized light. The reflective type polarizer absorbs only a small amount of light, and thus generates only a small amount of heat. Therefore, the reflective type polarizer can reduce the amount by which the temperature of the light-modulating element rises. When a reflective type polarizer is disposed adjacent to the light-incoming surface of the light-modulating element, it is possible to prevent the light-modulating element from being irradiated with light reflected from the polarizer, thereby obviating the problem of a malfunction of the light-modulating element caused by light reflected by the polarizer.

The present invention not only applies to a projector with one light-modulating element, but also to a projector with a plurality of light-modulating elements. More specifically, the present invention may be applied to a projector comprising color separation means for separating the light from the light source into a plurality of color light beams; a plurality of the light-modulating elements for modulating the respective color light beams in accordance with image information; color synthesizing means for synthesizing the respective color light beams modulated by the light-modulating elements; and projecting means for projecting in enlarged form the flight synthesized by the color synthesizing means onto a projection surface.

In this projector, it is desirable that each light-modulating element and each polarizer be supported by a dust protection member, and that each dust protection member be removably affixed to the light-incoming surface of the light synthesizing means. In this case, it is not necessary to directly touch the light-modulating element in order to mount it at the side of the color synthesizing means, so that it is possible to eliminate the problem of breakage or defects which occur in the light-modulating element when it interferes with other component parts. It is also possible to facilitate replacement the light-modulating element.

BRIEF DESCRIPTION OF THE DRAWINGS

FIGS. 14(A)–14(C) are schematic structural views of the optical system incorporated in the optical unit of a conventional projector.

DETAILED DESCRIPTION OF PREFERRED EMBODIMENTS

A description will now be given of embodiments of the present invention with reference to the drawings. In the description, unless otherwise specified, the Z direction represents the direction of travel of light, the Y direction represents the direction towards which the hand of a clock points when it is 12 o'clock viewed from the Z direction, and the X direction represents the direction towards which the hand of a clock points when it is 3 o'clock viewed from the Z direction.

Figure 1:
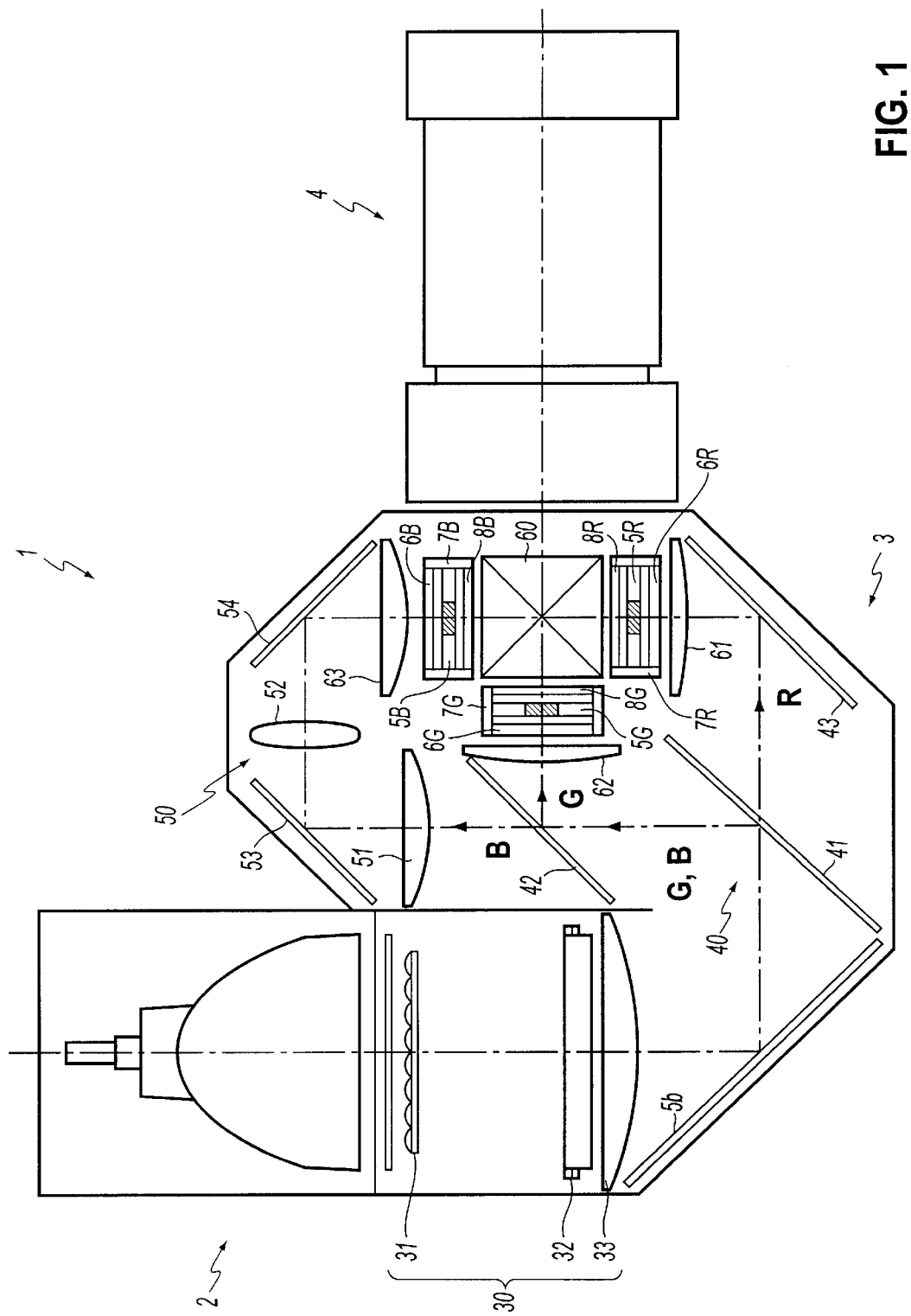
FIG. 1 is a schematic plan view of the structure of a projector to which the present invention is applied.

FIG. 1 is a plan view schematically showing the structure of a projector of the present invention. The projector 1 comprises a light source unit 2, an optical unit 3, and a projection lens 4.

The optical unit 3 comprises an integrator optical system 30 including a first optical element 31, a second optical element 32, and a superimposing lens 33. It also comprises a color separation optical system 40 including dichroic mirrors 41 and 42 and a reflecting mirror 43. It further comprises a light-guiding optical system 50 including a light-incoming side lens 51, a relay lens 52, and reflecting mirrors 53 and 54. Still further, it comprises three field lenses 61, 62, and 63, three liquid crystal panels 5R, 5G, and 5B, and a cross dichroic prism 60.

The light source unit 2 is disposed adjacent to the light-incoming surface of the first optical element 31 of the optical unit 3. The projection lens 4 is disposed adjacent to the light-outgoing surface of the cross dichroic prism 60 of the optical unit 3.

Figure 2:
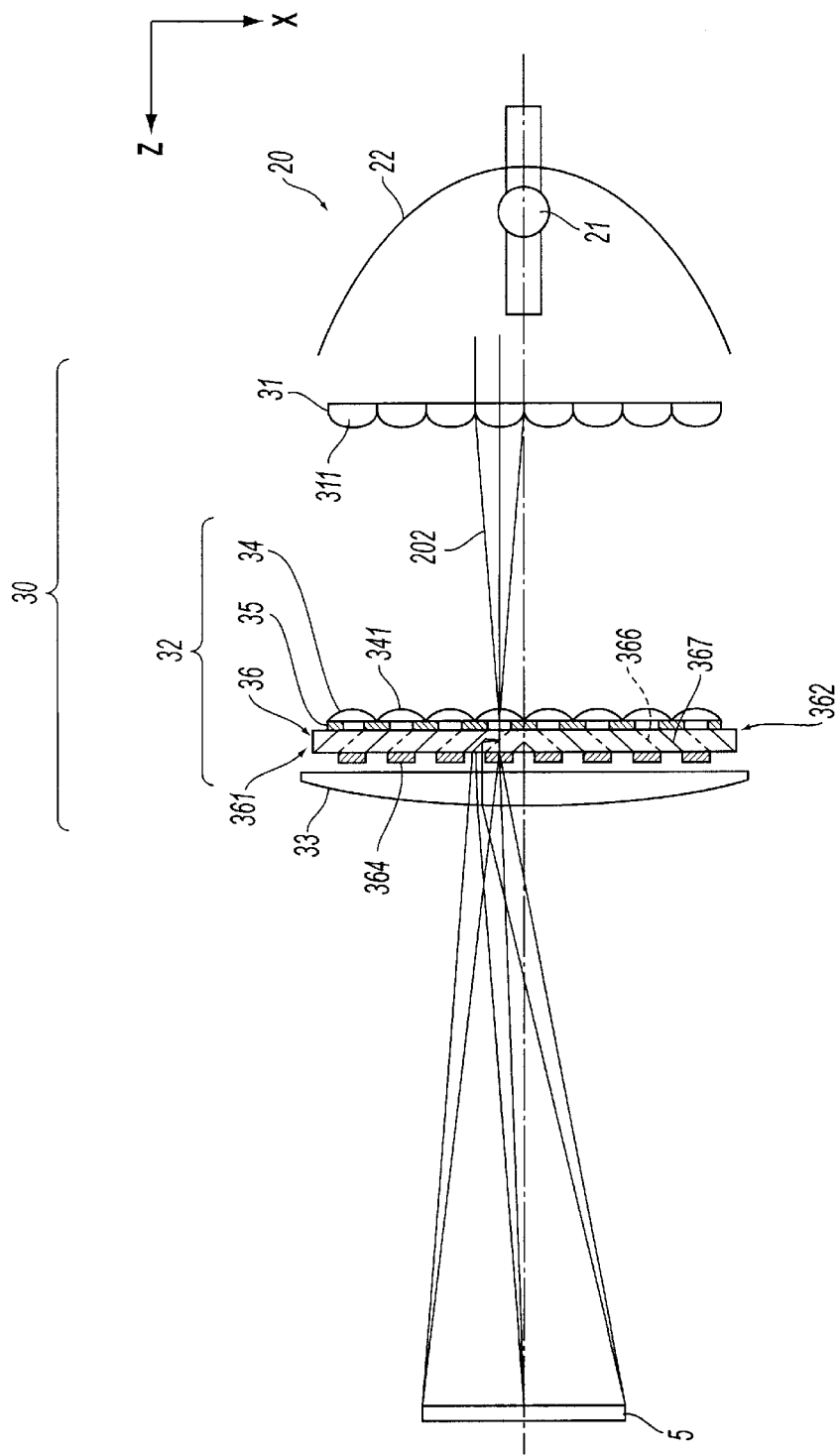
FIG. 2 illustrates an integrator illuminating optical system for illuminating three liquid crystal panels being illumination areas of the projector of FIG. 1.

FIG. 2 illustrates an integrator illuminating optical system for illuminating the three liquid crystal panels being illumination areas of the projector of FIG. 1. The integrator illuminating optical system comprises a light source 20 provided in the light source unit 2; and the integrator optical system 30 provided in the optical unit 3. The integrator optical system 30 comprises the first optical element 31, the second optical element 32, and the superimposing lens 33. The second optical element 32 comprises a light condenser lens 34, a light-shielding plate 35, and a polarization conversion element array 36. In FIG. 2, in order to simplify the description, only the main component parts required for illustrating the functions of the integrator illuminating optical system are shown.

The light source 20 comprises a light source lamp 21 and a concave mirror 22. Radiant light beams from the light source lamp 21 are reflected by the concave mirror 22, which converts them into substantially parallel light beams and causes them to travel towards the first optical element 31. A halogen lamp, a metal halide lamp, or a high-pressure mercury lamp is often used for the light source lamp 21. For the concave mirror 22, it is preferable to use a parabolic mirror.

Figures 3A, 3B:
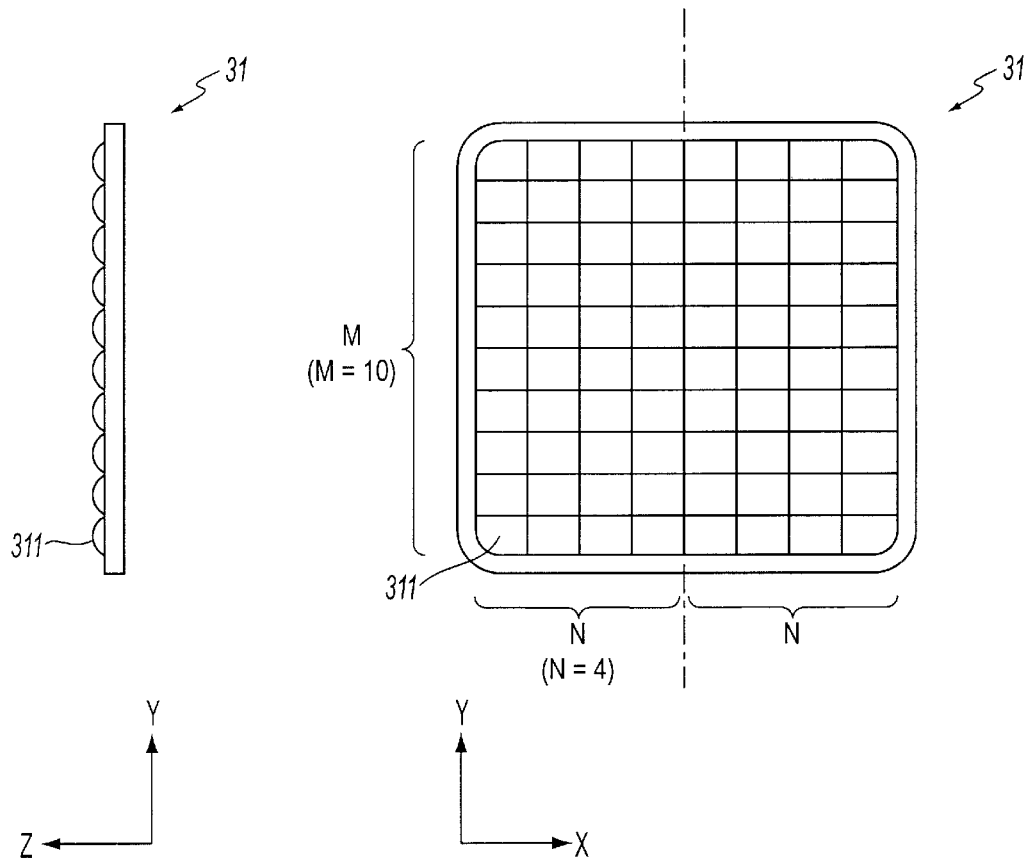
FIGS. 3(A) and 3(B) illustrate the appearance of the first optical element, as viewed from the front and side thereof.

FIGS. 3(A) and 3(B) illustrate the appearance of the first optical element 31 as viewed from the front and side thereof. The first optical element 31 is a lens array of small lenses 311, with a rectangular contour, disposed in a matrix arrangement consisting of M rows in the vertical direction and 2N rows in the horizontal direction. There are N rows at the left and right of a line passing through the center portion of the lens array. Here, M=10, and N=4. The external shape of each of the small lenses 311 as viewed from the Z direction is set so that it is almost the same as the shape of the liquid crystal panels 5. For example, if the aspect ratio (or the ratio between the vertical and horizontal dimensions) of the image forming area of a liquid crystal panel is 4:3, then the aspect ratio,of each of the small lenses 311 is also set at 4:3.

The condenser lens 34 of the second optical element 32 is also a lens array with a structure similar to that of the first optical element 31. The first optical element 31 and the condenser lens 34 may face either in the +Z direction or the −Z direction. They may also face different directions, as shown in FIG. 2.

Figure 4:
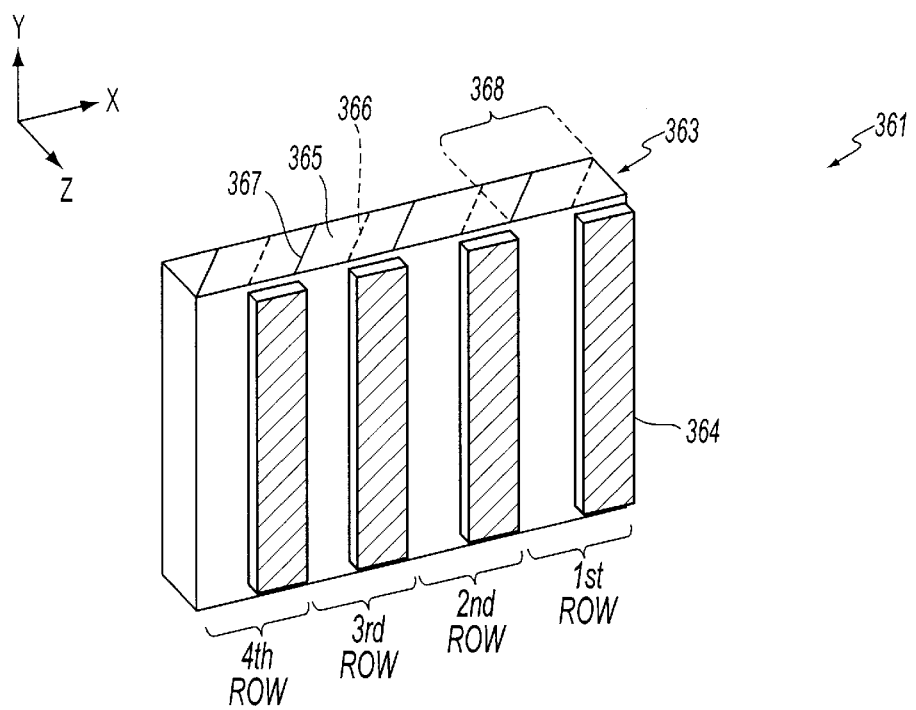
FIG. 4 is a perspective view of the appearance of the polarization conversion element array.

As shown in FIG. 2, in the polarization conversion element array 36, two polarization conversion element arrays 361 and 362 face each other so as to be symmetrically disposed with respect to an optical axis. FIG. 4 is an external perspective view of the polarization conversion element array 361. The polarization conversion element array 361 comprises a polarization splitter array 363, and λ/2 phase plates 364 (represented by slanted lines in the figure) selectively disposed at parts of the light-outgoing surface of the polarization splitter array 363. The polarization splitter array 363 is formed by successively adhering a plurality of columnar, parallelogrammic cross section, light-transmissive members 365. Polarization separating films 366 and reflecting films 367 are alternately formed at the interfaces of the light-transmissive members 365. The λ/2 phase plates 364 are selectively adhered to the image portion formed in the X direction at the light-outgoing surface of either of the polarization separating films 366 or the reflecting films 367. Here, the λ/2 phase plates 364 are adhered to the image portion formed in the X direction at the light-outgoing; surface of the polarization separating films 366.

Figure 5:
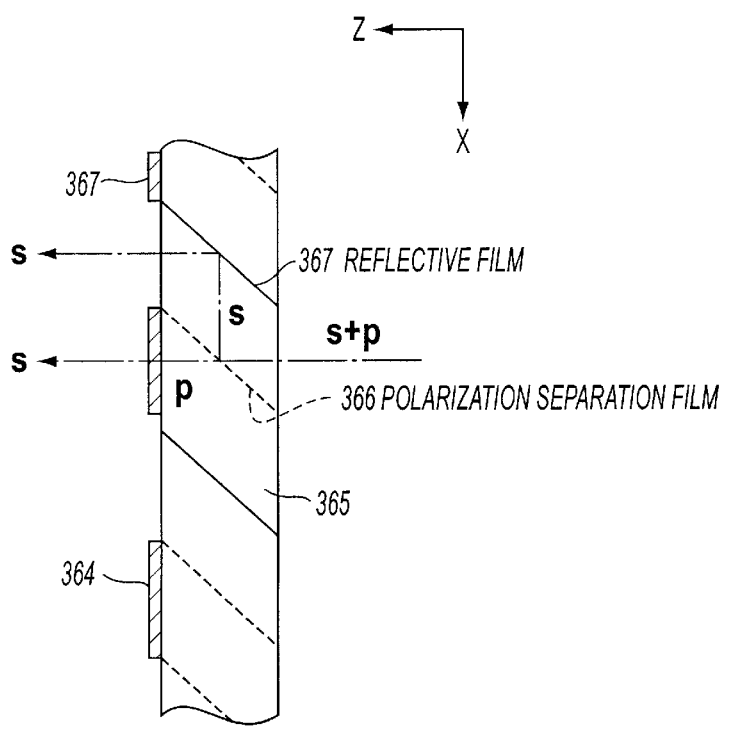
FIG. 5 illustrates the functions of the polarization conversion element array.

The polarization conversion element array 361 converts the light beams incident thereupon into one type of linearly polarized light beams (such as s-polarized or p-polarized light beams), which leave therefrom. FIG. 5 illustrates the function of the polarization conversion element array 361. Unpolarized light (or randomly polarized light), containing s-polarized light and p-polarized light components, strike the light-incoming surface of the polarization conversion element. A polarization separating film 366 separates the incident light into an s-polarized light and a p-polarized light. The s-polarized light is reflected substantially vertically by this polarization separating film 366, and then reflected again by a reflecting film 367. On the other hand, the p-polarized light passes through the polarization separating film 366. A λ/2 phase plate 364 is disposed at the light-outgoing plane of the p-polarized light that has passed through the polarization separating film 366 in order to convert the p-polarized light into an s-polarized light, which leaves therefrom. Accordingly, most of the light beams which have passed through the polarization conversion element leave it as s-polarized light beams. When light beams are required to leave the polarization conversion element as p-polarized light beams, a λ/2 phase plate 364 can be placed at the light-outgoing plane of the s-polarized light beams reflected by a reflecting film 367.

A block including a polarization separating film 366 and a reflecting film 367 adjacent thereto, and a λ/2 phase plate 364 can be considered as one polarization conversion element 368. The polarization conversion element array 361 consists of a plurality of such polarization conversion elements 368 arranged in the X direction. In the embodiment, the polarization conversion element array 361 consists of four rows of such polarization conversion elements 368.

The structure of the polarization conversion element array 362 is exactly the same as that of the polarization conversion element array 361, so that a description thereof will not be given below.

Figure 6:
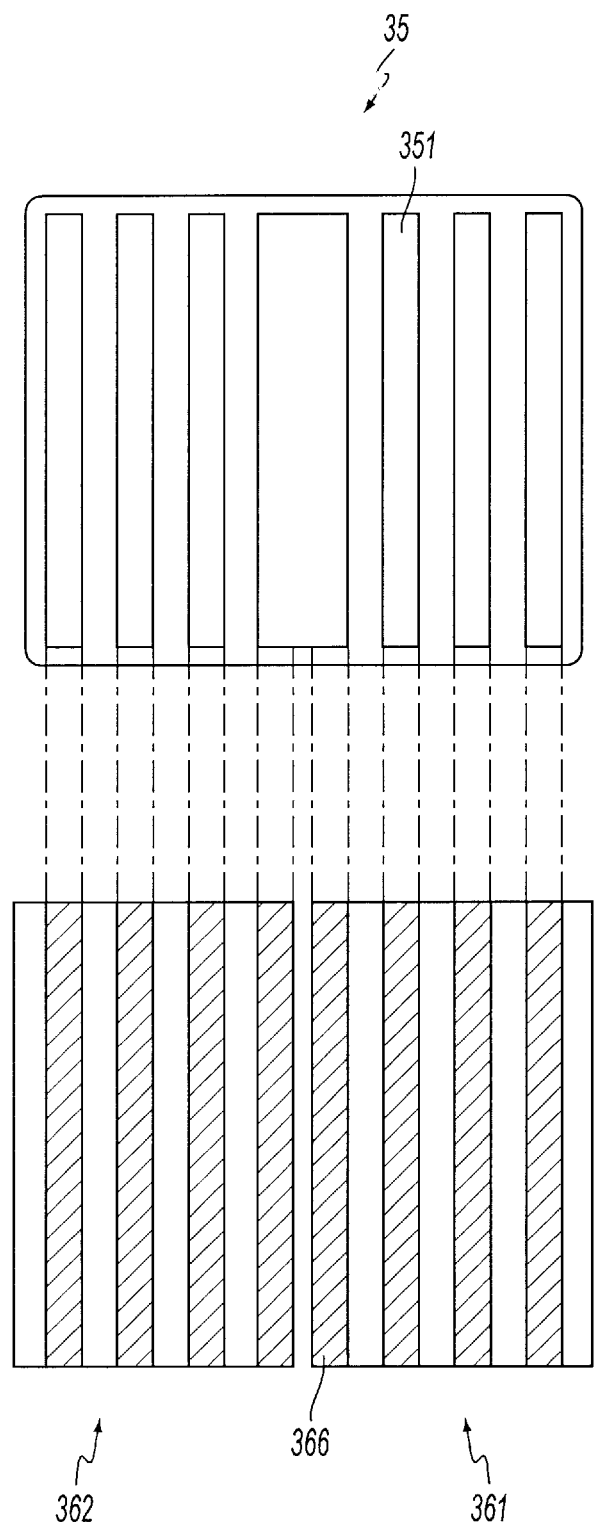
FIG. 6 is a plan view of a polarizer.

FIG. 6 is a plan view of the light-shielding plate 35. The light-shielding plate 35 has substantially rectangular, plate-shaped openings 351, which are provided so that light beams are incident only upon the light-incoming surface corresponding to the polarization separating films 366 in the light-incoming surfaces of the two polarization conversion elements 361 and 362.

Unpolarized light emitted from the light source 20 of FIG. 2 is divided into a plurality of partial light beams 202 by the plurality of small lenses 311 of the first optical element 31 and the plurality of small lenses 341 of the condenser lens 34 of the second optical element 32 of the integrator optical system 30, and gathered and concentrated near the polarization separating films 366 of the two polarization conversion element arrays 361 and 362. Accordingly, the condenser lens 34 is capable of gathering and concentrating the plurality of partial light beams 202, which have left the first optical element 31, at the polarization separating films 366 of the two polarization conversion element arrays 361 and 362. The plurality of partial light beams 202 incident upon the two polarization conversion element arrays 361 and 362 are converted into one type of linearly polarized light beams and leave them, as described above. The plurality of partial light beams which have left the two polarization conversion element arrays 361 and 362 are superimposed upon the liquid crystal panels (5R, 5G, and 5B), to be described later, by the superimposing lens 33. This allows the integrator optical system 30 to uniformly illuminate the liquid crystal panels 5.

The projector 1 of FIG. 1 comprises a reflecting mirror 56 for guiding the light beam from the superimposing lens 33 towards the color separation optical system 40. Depending on the structure of the illuminating optical system, the reflecting mirror 56 may not be required.

The color separation optical system 40 comprises two dichroic mirrors 41 and 42, and is capable of separating the light leaving the superimposing lens 33 into light beams of three different colors, that is, red light beams, green light beams, and blue light beams. Of the three different color light beams, the red light beams pass through the first dichroic mirror 41, while the blue light beams and the green light beams are reflected thereby. The red light beams R which have passed through the first dichroic mirror 41 are reflected by the reflecting mirror 43, and pass through a field lens 61 in order to reach the liquid crystal panel 5R for red light. The field lens 61 is capable of converting the respective partial light beams coming from the superimposing lens 33 into light beams parallel to the center axis thereof (principal rays). The function of the field lenses 62 and 63, provided in front of the liquid crystal panels 5G and 5B, respectively, is the same as the function of the field lens 61.

Of the blue light beams B and the green light beams G reflected by the first dichroic mirror 41, the green light beams G are reflected by the second dichroic mirror 42, and pass through the field lens 62 in order to arrive at the liquid crystal panel 5G for green light. On the other hand, the blue light beams B pass through the second dichroic mirror 42, and then through the light-guiding optical system 50, that is, through the light-incoming side lens 51, the reflecting mirror 53, the relay lens 52, and the reflecting mirror 54, after which the blue light beams B pass through the field lens 63 and reach the liquid crystal panel 5B for blue light. The optical path of the blue light beams B is longer than the optical paths of the other color light beams. Accordingly, the light-guiding optical system 50 for blue light B is provided in order not to reduce the efficiency with which light is used when, for example, light scattering occurs. In other words, the light-guiding optical system 50 is provided to transmit the partial light beams incident upon the light-incoming side lens 51 as they are to the field lens 62.

The three liquid crystal panels 5R, 5G, and 5B function as light modulating elements for modulating the light beams incident thereupon in accordance with corresponding given image information. Accordingly, the different color light beams incident upon the three liquid crystal panels 5R, 5G, and 5B are modulated in accordance with the corresponding given image data in order to form images in correspondence with these different color light beams.

The modulated color light beams from the three liquid crystal panels 5R, 5G, and 5B impinge upon the cross dichroic prism 60. The cross dichroic prism 60 functions as a color synthesizing means for synthesizing the three modulated color light beams in order to form a color image. In the cross dichroic prism 60, a dielectric multilayer film, which reflects red light beams R, and a dielectric multilayer film, which reflects blue light beams B, are formed at the interfaces between four right-angle prisms so as to form a substantially X shape. The modulated three different colors are synthesized by the dielectric multilayer films in order to form the color image to be projected. The synthesized light generated by the cross dichroic prism 60 leaves it and travels towards the projection lens 4. The projection lens 4 is capable of projecting a color image, formed by the synthesized light beams, onto a projection screen.

Figure 7A:
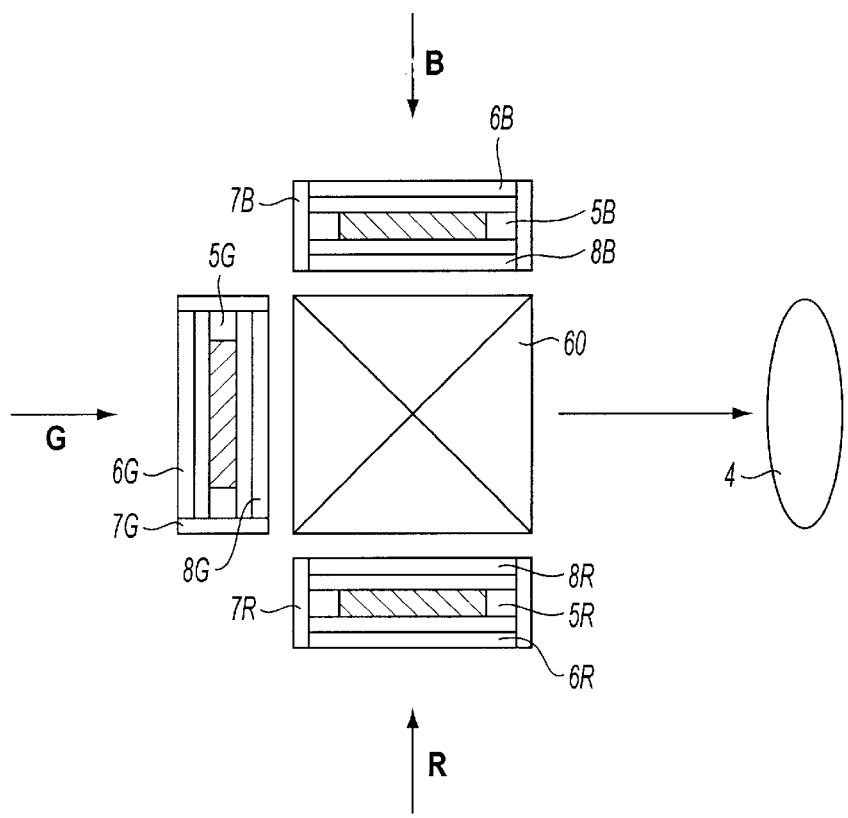
FIGS. 7(A) and 7(B) are plan views of liquid crystal panels and portions therearound.
Figure 7B:
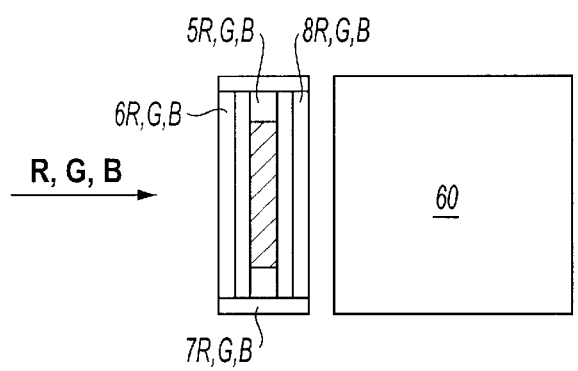

FIGS. 7(A) and 7(B) are enlarged views of the liquid crystal panels 5R, 5G, and 5B, and the portions therearound. As shown in these figures, the respective liquid crystal panels 5R, 5G, and 5B are disposed at predetermined intervals at the sides excluding the light-outgoing surface side (that is, at the three light-incoming surface sides) of the cross dichroic prism 60. The respective liquid crystal panels 5R, 5G, and 5B are positioned at right angles to the path of their respective color light R, G, and B. Polarizers 6R, 6G, and 6B are disposed adjacent to the light-incoming surface of their respective liquid crystal panels 5R, 5G, and 5B, while polarizers 8R, 8G, and 8B are disposed adjacent to the light-outgoing surface of their respective liquid crystal panels 5R, 5G, and 5B.

The polarizers 6R, 6G, and 6B, disposed adjacent to the light-incoming surface of their respective liquid crystal panels, absorb one type of polarized light beams (p-polarized light beams in the embodiment) contained in the respective color light beams R, G, and B; and causes color light beams R, G, and B, containing only a small amount of p-polarized light components, to be incident upon the liquid crystal panels 5R and 5G. When the color light beams R, G, and B pass through their respective polarizers 6R, 6G, and 6B, almost all of the p-polarized components contained in each of the different color light beams are removed, whereby the light beams become (s-polarized) lights with polarization planes that are substantially aligned. Therefore, light beams with almost no mixture of other types of polarized light components impinge upon the respective liquid crystal panels 5R, 5G, and 5B.

The polarizers 8R, 8G, and 8B, disposed adjacent to the light-outgoing surface of their respective liquid crystal panels, absorb one type of polarized light component of the respective color light beams R, G, and B, modulated by the respective liquid crystal panels 5R, 5G, and 5B; and causes only the other type of polarized light component to pass therethrough. When the modulated color light beams R, G, and B pass through their respective polarizers 8R, 8G, and 8B, they become light beams with polarization planes that acre almost aligned.

In the projector 1 of the embodiment, the liquid crystal panel 5R, and the polarizers 6R and 8R, disposed adjacent to the light-incoming surface and the light-outgoing surface of the liquid crystal panel 5R, respectively, are supported by a dust protection member 7R. The dust protection member 7R cuts off from the outside the area between the polarizer 6R and the light-incoming surface of the liquid crystal panel 5R as well as the area between the polarizer 8R and the light-outgoing surface of the liquid crystal panel 5R; and air layers are formed therebetween. In the same way, the liquid crystal panel 5G for the green light, the polarizers 6G and 8G, the liquid crystal panel 5B for the blue light, and the polarizers 6B, 8B are supported by a dust protection member 7G; and the liquid crystal panel 5B for the red light and the polarizers 6R and 8R are supported by a dust protection member 7B, with an air layer being formed between each liquid crystal panel and the polarizers associated thereto.

A further description will now be given of the dust protection members. Since the dust protection members all have the same structure, they will be described, taking the dust protection member 7R for the red light as an example.

Figure 8:
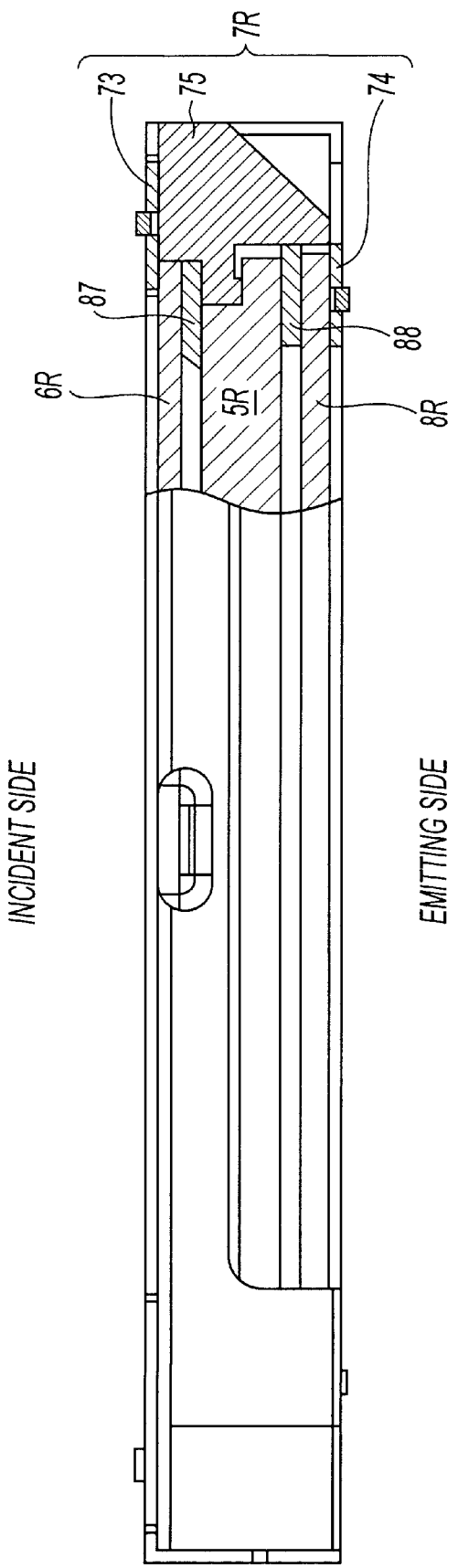
FIG. 8 is a schematic sectional view of the structure of a dust protection member.
Figure 9:
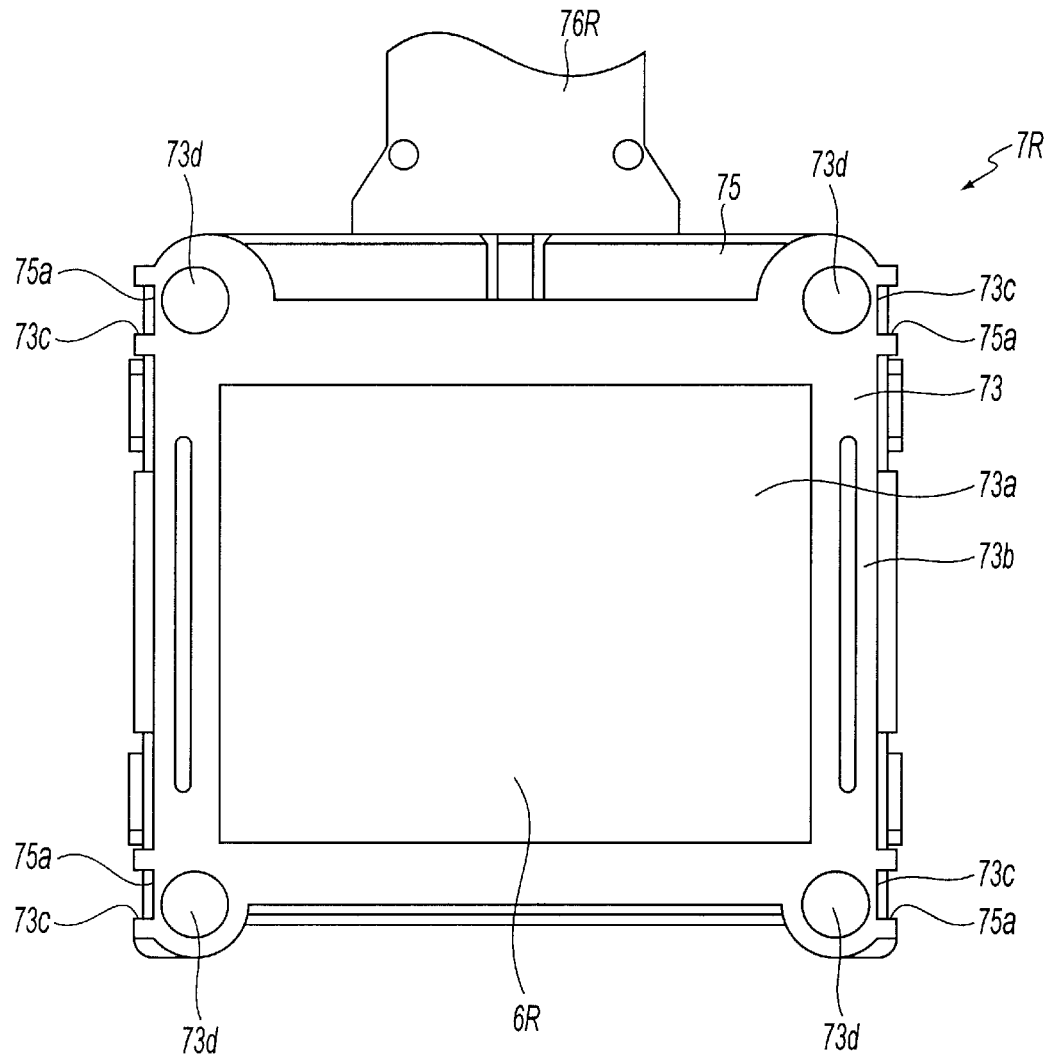
FIG. 9 is a schematic plan view of the structure of the dust protection member, as seen from the light-incoming surface side.
Figure 10:
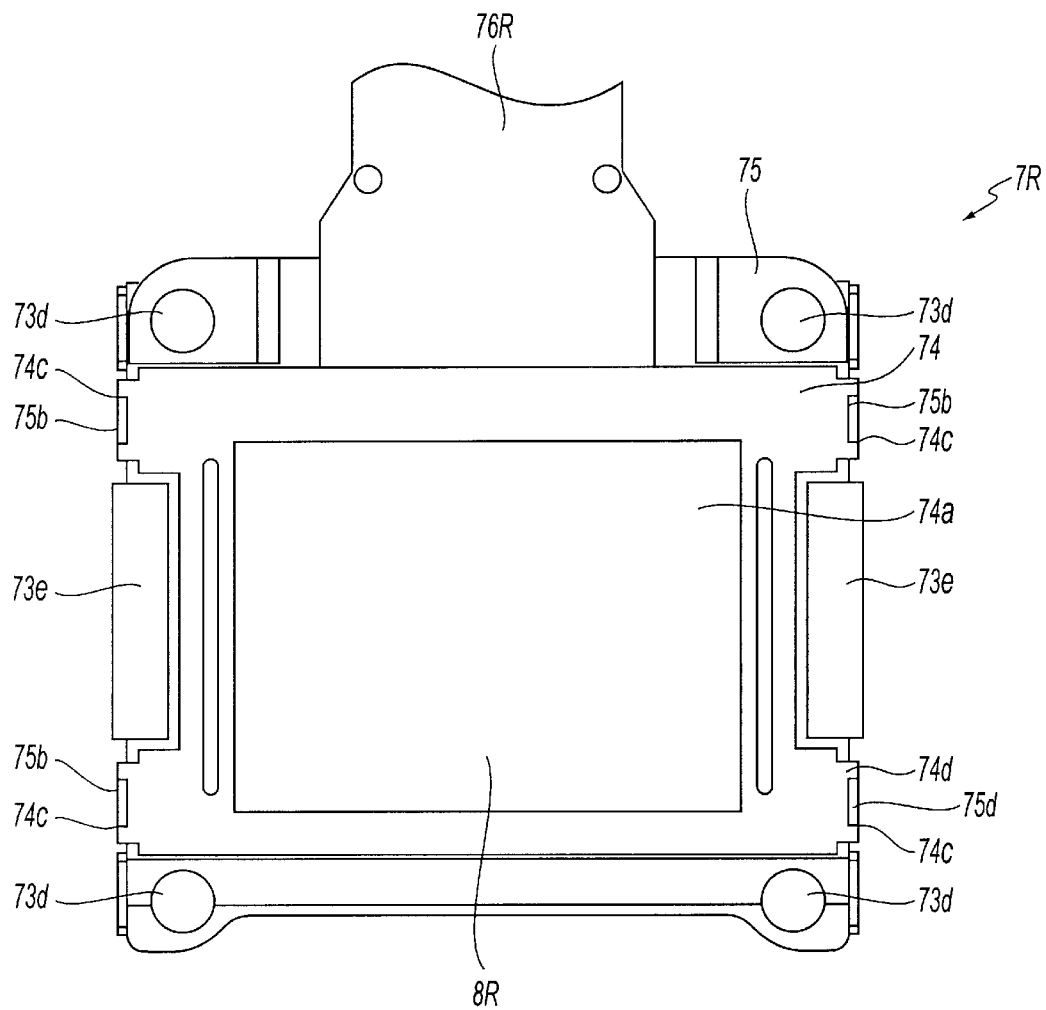
FIG. 10 is a schematic plan view of the structure of the dust protection member, as seen from the light-outgoing surface side.

FIG. 8 is a schematic sectional view of the structure of the dust protection member 7R. FIG. 9 is a schematic plan view of the structure of the dust protection member 7R, as seen from the light-incoming side. FIG. 10 is a schematic plan view of the structure of the dust protection member 7R, as seen from the light-outgoing side.

As shown in these figures, the polarizer 6R is disposed at the light-incoming surface of the liquid crystal panel 5R through a cushion 87, and the polarizer 8R is disposed at the light-outgoing surface through a cushion 88. In the embodiment, the liquid crystal panel 5R and the polarizers 6R and 8R are supported by the dust protection member 7R.

The dust protection member 7R comprises a first outside frame 73 and a second outside frame 74, which sandwich the liquid crystal panel 5R and the polarizers 6R and 8R, and a middle frame 75, which cuts off from the outside the area between the polarizer 8R and the light-outgoing surface of the liquid crystal panel 5R as well as the area between the polarizer 6R and the light-incoming surface of the liquid crystal panel 5R. The liquid crystal panel 5R and the polarizers 6R and 8R are supported by being sandwiched between the first and second outside frames 73 and 74.

The first outside frame 73 has a rectangular opening 73a for passing light therethrough, and four peripheral walls 73b of a predetermined thickness. The second outside frame 74 similarly has a rectangular opening 74a for passing light therethrough, and four peripheral walls 74b of a predetermined thickness. The second frame 74 is smaller than the first outside frame 73.

The middle frame 75 has a rectangular shape, and surrounds the outer periphery of the liquid crystal panel 5R and the polarizers 6R and 8R. Two engaging projections 75a are formed at two locations of the left and right side surfaces of the middle frame 75. Engaging holes 73c which can be fitted onto the engaging projections 75a are formed in the first outside frame 73 in correspondence with the locations of the engaging projections 75a.

Engaging projections 75b are formed at two locations of the left and right side surfaces of the middle frame 75. Engaging holes 74c which can be fitted onto the engaging projections 75b are formed in the second outside frame 74 in correspondence with the locations of the engaging projections 75b.

From the outer side of the polarizer 6R provided adjacent to the light-incoming surface of the liquid crystal panel 5R, the first outside frame 73 is pushed into the middle frame 75 so that the engaging projections 75a are inserted into their respective engaging holes 73c. From the outer side of the polarizer 8R provided adjacent to the light-outgoing surface side of the liquid crystal panel 5R, the second outside frame 74 is pushed into the middle frame 75 so that the engaging projections 75b are inserted into their respective engaging holes 74c. This causes the liquid crystal panel 5R and the polarizers 6R and 8R to be supported by the dust protection member 7R. In addition, this causes the area between the polarizer 6R and the light-incoming surface of the liquid crystal panel 5R and the area between the polarizer 8R and the light-outgoing surface of the liquid crystal panel 5R to be cut off from the outside. The upwardly extending portion of the dust protection member 7R is a flexible cable 76R used for wiring operations.

As described above, in the projector 1, the dust protection member 7R cuts off from the outside the area between the light-outgoing surface of the liquid crystal panel 5R and the polarizer 8R disposed adjacent to the light-outgoing surface of the liquid crystal panel 5R; and air layers are formed therebetween. Since the air layers are formed, the amount of heat generated at the polarizer 8R and transmitted to the, liquid crystal panel 5R is reduced. In other words, compared to the case where the polarizer 8R is directly mounted to the light-outgoing surface of the liquid crystal panel 5R, the heat load on the liquid crystal panel 5R can be reduced. Therefore, even when a polarizer with excellent polarization selection characteristics is used, the amount by which the temperature of the liquid crystal panel 5R rises can be reduced, making it possible to prevent the optical characteristics of the liquid crystal panel 5R from deteriorating. As with the liquid crystal panel 5R, it is possible to prevent the optical characteristics of the liquid crystal panels 5G and 5B from deteriorating.

The area between the polarizer 8R and the light-outgoing surface of the liquid crystal panel 5R is cut off from the outside, so that even when dust or the like is scattered by air currents, produced in the device to cool the polarizer 8R, the dust will not enter into the area between the polarizer 8R and the light-outgoing surface of the liquid crystal panel 5R. Therefore, it is possible to prevent sticking of dust or the like onto the light-outgoing surface of the liquid crystal panel 5R. In addition, the problem of light, modulated at the liquid crystal panel 5R, being scattered by dust between the polarizer 8R and the light-outgoing surface of the liquid crystal panel 5R does not occur. As with the liquid crystal panel 5R, it is possible to prevent sticking of dust or the like onto the light-outgoing surface of the liquid crystal panels 5G and 5B.

Since it is possible to prevent deterioration in the optical characteristics of the liquid crystal panels caused by heat generated by the respective polarizers, a high-quality image with good contrast can be projected onto the screen.

In the projector 1, the area between the polarizer, disposed adjacent to the light-incoming surface of the liquid crystal panel, and the light-incoming surface of the liquid crystal panel are cut off from the outside by the dust protection member. Thus, since the amount of heat generated at the polarizer disposed at the light-incoming side of the liquid crystal panel is reduced, less heat is transmitted to the liquid crystal panel, making it possible to reduce the amount by which the temperature of the liquid crystal panel rises by a greater amount. In addition, it is possible to prevent sticking of dust or the like onto the light-incoming surface of the liquid crystal panel, so that a higher quality image can be projected onto the screen.

More than one polarizer may be disposed at the light-incoming side of a liquid crystal panel. When a plurality of polarizers are disposed thereat, the amount of heat generated per polarizer can be reduced, so that each of the polarizers can be efficiently cooled by air currents generated in the device. In other words, the heat load on the liquid crystal panel can be reduced.

Figure 11:
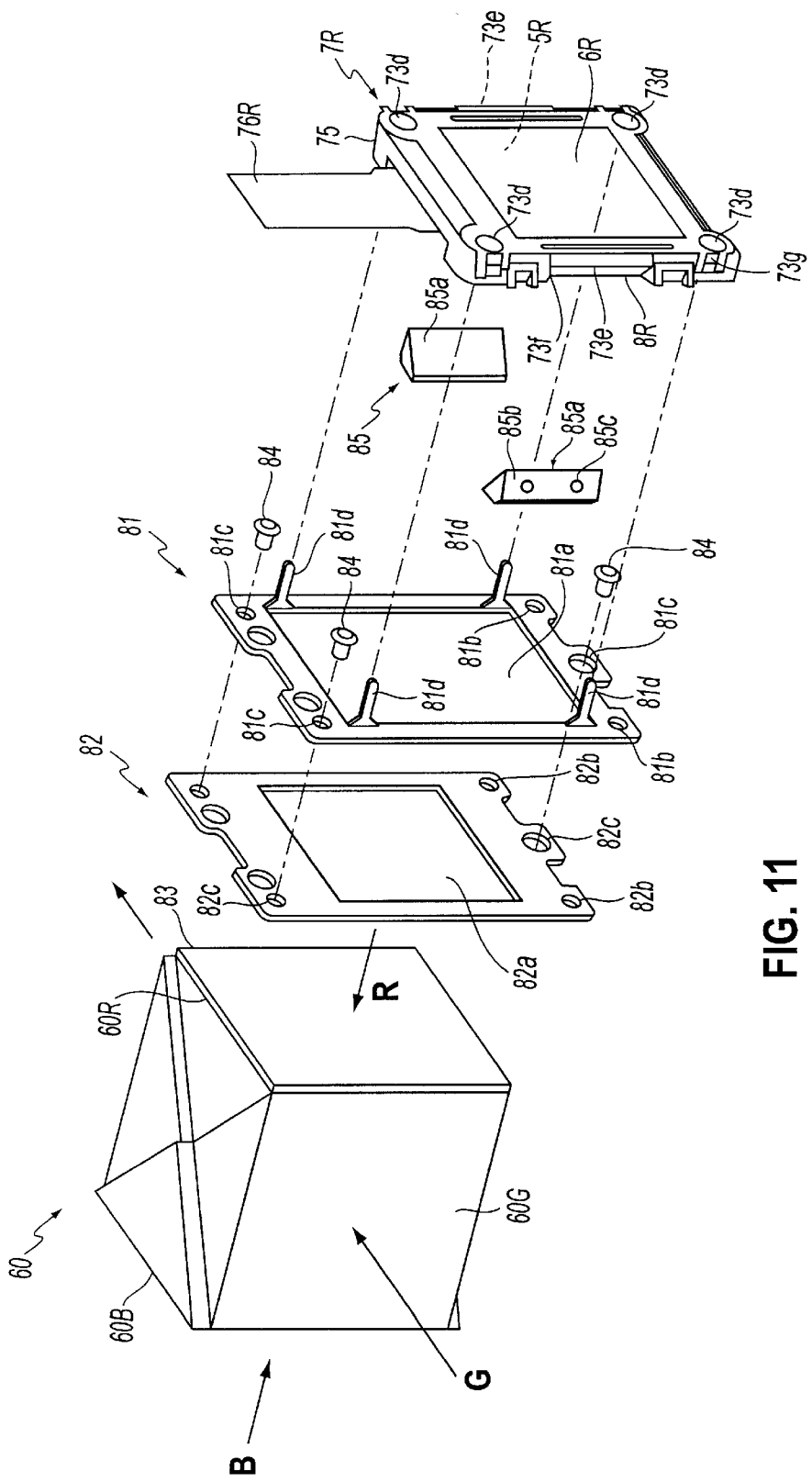
FIG. 11 is an exploded perspective view for illustrating how the dust protection member is mounted to the cross dichroic prism.

FIG. 11 illustrates the dust protection member 7R, which supports the liquid crystal panel 5R and the polarizers 6R and 8R, being mounted to the light-incoming surface 60R of the cross dichroic prism 60. With reference to this figure, a description will be given of the mounting structure of the dust protection member 7R to the light-incoming surface 60R of the cross dichroic prism 60.

As shown in FIG. 11, the dust protection member 7R is such as to be securable to a frame plate 82, which is adhered to the light-incoming surface 60R of the cross dichroic prism 60, through an intermediate frame plate 81. A red filter 83 is affixed to the light-incoming surface 60R of the cross dichroic prism 60.

The intermediate frame plate 81 is a rectangular frame about the same size or a size larger than the first outside frame 73 of the dust protection member 7R; and has a rectangular opening 81a for passing light therethrough. Engaging projections 81d, extending vertically from the surface of the frame plate, are formed at the four corners of the edges defining the rectangular opening 81a in the intermediate frame plate 81. Engaging holes 73d, which can be inserted onto the engaging projections 81d, are formed at the dust protection member 7R side in correspondence with the locations of the respective engaging projections 81d. In the embodiment, the respective engaging holes 73d are formed by the through holes formed in the first outside frame 73 and the middle frame 75 of the dust protection member 7R. Therefore, when the engaging projections 81d of the intermediate frame plate 81 are placed onto the respective engaging holes 73d of the dust protection member 7R, the engaging projections 81d are inserted into the respective engaging holes 73d, whereby the intermediate frame plate 81 and the dust protection member 7R are temporarily secured together.

Similarly, the fixing frame plate 82 is a rectangular frame plate with a rectangular opening 82a for passing light therethrough. The rectangular opening 82a, formed in the fixing frame plate 82, is smaller than the light-outgoing surface of the polarizer 8R. Using an adhesive, the fixing frame plate 82 is fixed to the red filter 83 provided at the light-incoming surface 60R of the cross dichroic prism 60.

Screw holes 82c are formed in both corners of the top portion of the fixing frame plate 82, and in the center, as viewed in the horizontal direction, of the lower portion of the fixing frame plate 82. Screw holes 81c are formed in the intermediate frame plate 81 in correspondence with the locations of the three screw holes 82c. By inserting countersunk screws 84 in the respective screw holes 81c and 82c, the intermediate frame plate 81 is secured to the fixing frame plate 82. Accordingly, in the embodiment, the intermediate frame plate 81 is secured to the fixing frame plate 82 with three screws 84. However, four or more screws or two or fewer screws may be used. In general, the fewer the number of screws, the fewer the number of fastening operations, thereby facilitating the manufacturing process.

Here, engaging projections 82b are formed at the left and right corners of the lower portion of the fixing frame plate 82, and engaging holes 81b are formed in the left and right corners of the lower portion of the intermediate frame plate 81 in correspondence with the locations of the two engaging projections 82b. The engaging holes 81b of the intermediate frame plate 81 are brought into alignment with the engaging projections 82b of the fixing frame plate 82 in order to temporarily screw the intermediate frame plate 81 to the fixing frame plate 82 using the screws 84. This results in more precise positioning of the frame plates relative to each other.

The projector 1 of the embodiment comprises a positioning means for positioning the dust protection member 7R with respect to the intermediate frame plate 81 secured to the fixing frame plate 82. The positioning means comprises two wedges 85. Wedge guiding surfaces 73e to 73g, which come into contact with the inclined surface 85a of the wedges 85, are formed vertically at the center portion of the left and right sides of the dust protection member 7R. When the dust protection member 7R is temporarily secured to the intermediate frame plate 81, a wedge-inserting groove is formed between each wedge guiding surface 73e and the opposing intermediate frame plate 81. After temporarily securing the dust protection member 7R to the intermediate frame plate 81, when the two wedges 85 are struck into the left and right sides of the dust protection member 7R, and the amount by which these wedges 85 are pushed therein is adjusted, the position of the dust protection member 7R can be regulated, so that the liquid crystal panel 5R, supported by the dust protection member 7R, can be positioned.

A description will now be given of the procedure for mounting the dust protection member 7R onto the light-incoming surface 60R of the cross dichroic prism 60. Dust protection member 7R, which supports the liquid crystal panel 5R and the polarizers 6R and 8R, is provided. In addition, cross dichroic prism 60, with color filter 83 adhered at the light-incoming surface 60R, is provided. Then, fixing frame plate 82 is positioned at and adhered to the red filter 83 affixed to the light-incoming surface 60R of the cross dichroic prism 60. Ultraviolet curing adhesive or the like may be used for the adhesive.

The intermediate frame plate 81 is positioned at and screwed to the surface of the fixing frame plate 82 with three countersunk screws 84. Thereafter, the dust protection member 7R, which supports the liquid crystal panel 5R and the like is positioned at and temporarily secured to the intermediate frame plate 81. More specifically, with the engaging projections 81d of the intermediate frame plate 81 being brought into alignment with the engaging holes 73d in the dust protection member 7R, the dust protection member 7R is pushed into the intermediate frame plate 81. Precise positioning can be more easily achieved when the fixing frame plate 82 and the intermediate frame plate 81 are previously formed into an integral structure prior to adhering the fixing frame plate 82 to the cross dichroic prism 60.

Using the wedges 85 as positioning means, the liquid crystal panel 5R is positioned with respect to the light-incoming surface 60R of the cross dichroic prism 60. More specifically, the two wedges 85 are inserted between the dust protection member 7R and the intermediate frame plate 81, which are temporarily secured together, so as to be placed along their respective wedge guiding surfaces 73e of the dust protection member 7R. By adjusting the amount by which each of the wedges 85 are inserted, focusing and alignment of the liquid crystal panel 5R is performed.

After the positioning, the wedges 85 are bonded with an adhesive between the intermediate frame plate 81 and the dust protection member 7R that is positioned. In this case, an ultraviolet curing adhesive may be used.

A description will be given in more detail of the positioning and bonding steps of the wedges 85.

The focus plane of the liquid crystal panel 5R is brought within the focus plane of the projection lens 4 using an adjusting device designed specifically for this purpose. Then, as described above, ultraviolet curing adhesive is injected into the gap between each engaging projection 81d of the intermediate frame plate 81 and its associated engaging hole 73d of the dust protection member 7R, after which the adhesive is irradiated with ultraviolet rays and hardened, whereby the intermediate frame plate 81 and the dust protection member 7R are temporarily secured together. Thereafter, at the intermediate frame plate 81 and the wedge guiding surfaces 73e of the dust protection member 7R, ultraviolet curing adhesive is irradiated with ultraviolet rays from the exposed end of each wedge 85 in order to actually affix the intermediate frame plate 81 and the dust protection member 7R. With reference to the liquid crystal panel 5G disposed at the center with respect to the liquid crystal panels 5R 5G, and 5B, pixel alignments in and focusing with respect to the liquid crystal panels 5R and 5B are performed in order to temporarily secure and actually affix the intermediate frame plate 81 and the dust protection member 7R.

The mounting structure of the liquid crystal panels 5G and 5B to the cross dichroic prism 60 is the same as the structure for mounting the liquid crystal panel 5R to the cross dichroic prism 60, so that a description thereof will be omitted.

When the dust protection member 7R is mounted to the cross dichroic prism 60 in the above-described way, the following advantages are obtained.

First, since dust protection member 7R is provided at the four peripheral edges of the liquid crystal panel 5R, it is not necessary to directly touch the liquid crystal panel 7R in order to mount it to the cross dichroic prism 60. Therefore, the problem of breakage or defects which occur in the liquid crystal panel 5R when it hits any other component part does not occur. In addition, since the liquid crystal panel 5R is covered by the dust protection member 7R, external light can be intercepted, making it possible to prevent a malfunction, caused by external light, from occurring in the liquid crystal panel 5R.

Second, the dust protection member 7R, which supports the liquid crystal panel 5R, is removably screwed to the light-incoming surface 60R of the cross dichroic prism 60 through the intermediate frame plate 81. Therefore, when, for example, the liquid crystal panel 5R becomes defective, it can be easily replaced by simply removing the screws 84. In addition, since the liquid crystal panel 5R is not directly adhered to the cross dichroic prism 60, the liquid crystal panel 5R can be replaced, without scratching the cross dichroic prism 60 and wastefully using expensive component parts.

Third, the dust protection member 7R, which supports the liquid crystal panel 5R, can be temporarily secured to the intermediate frame plate 81. After temporarily securing the dust protection member 7R, the wedges 85 can be used to position the liquid crystal panel 5R with respect to the light-incoming surface 60R of the cross dichroic prism 60. Therefore, positioning can be easily performed with the wedges 85 by carrying out a separate step, as a result of which wastage of facility cycle time is reduced.

In general, the wedges 85 are formed of glass. When the dust protection member 7R is a molded product of resin, which has a higher coefficient of thermal expansion than glass, the wedges 85 tend to fall off from the frame plates as a result of a difference in thermal expansion, or the wedges 85 may break due to temperature changes. In order to overcome this problem, it is desirable that the wedges 85 be a molded product of, for example, acrylic resin. When acrylic material is used, the wedges 85 can be formed by molding, so that costs are greatly reduced compared to the case where glass is used. It is to, be noted that when a material which passes ultraviolet rays therethrough is used for the wedges 85, ultraviolet curing adhesive whose temperature rises only slightly and having a short curing time can be used to bond the wedges 85.

When the dust protection member 7R has upper and lower end surfaces 73f and 73g as a result of forming the wedge guiding surfaces 73e, the wedges 85 are guided along these three surfaces. In other words, when an adhesive is applied to these surfaces and the wedges 85 are inserted, the wedges 85 automatically move inward while being guided along the three surfaces by the surface tension of the adhesive. Therefore, the bonding of the wedges 85 is simplified and less affected by external disturbances occurring during the bonding.

Although in the embodiment the dust protection member 7R is temporarily secured to the intermediate frame plate 81 with an adhesive, it may be temporarily secured thereto by soldering or the like. When the dust protection member 7R or the like is formed of resinous material, a dust protection member with a metallic member adhered at the adhering portion, or that with a metallized layer adhered to the adhering portion, may be used.

The dust protection member 7R, the intermediate frame plate 81, and the fixing frame plate 82 may be a molded product of thermoset resin with glass fiber or calcium carbonate therein. The coefficient of thermal expansion of such resinous material is closer in value to that of glass than common resinous materials. Therefore, it is possible to prevent image shift or the like caused by heat deformation occurring when they are adhered to the cross dichroic prism 60.

Although, as mentioned above, ultraviolet curing adhesive may be used as adhesive for adhering the fixing frame plate 82 to the cross dichroic prism 60, it is desirable to apply a base treating material to increase adhesivity. The red light incoming surface 60R and the blue light incoming surface 60B of the cross dichroic prism 60 face each other. Since blue light has a shorter wavelength, a portion of the blue light may pass through the reflecting film of the cross dichroic prism 60 and reach the red light incoming surface 60R facing the blue light incoming surface 60B. When such backlight impinges upon the liquid crystal panel 5R, a malfunction occurs. In the embodiment, red filter 83 is provided at the red light incoming surface 60R in order to intercept such backlight, making it possible to prevent a malfunction, caused by the backlight, from occurring in the liquid crystal panel 5R.

Since blue backlight has a large effect on the red light incoming surface 60R, a filter is mounted only to the red light incoming surface 60R. However, if a differently colored backlight has a large effect on a different light incoming surface or different light incoming surfaces, a filter may be provided at the different light incoming surface or the different light incoming surfaces.

However, a filter intercepts the ultraviolet rays used during adhering, so that the ultraviolet curing adhesive, used to adhere the fixing frame plate 82 to the light-incoming surfaces 60R, 60G, and 60B of the dichroic prism 60, may not be sufficiently irradiated with ultraviolet rays. To overcome this problem and to ensure adhering of the fixing frame plate 82 to the light-incoming surface 60R, it is desirable to apply a base treating material onto the adhering surfaces, and to use anaerobic adhesive along with the ultraviolet curing adhesive. Obviously, such a base treating material and an anaerobic adhesive may be applied to the light-incoming surfaces without filters.

Although ultraviolet curing adhesive is used as adhesive, other types of adhesives may also be used. For example, a hot melt adhesive may be used to adhere the fixing frame plate 82 and to bond the wedges 85, in which case it is not necessary to worry about the aforementioned filter-related problem.

In the embodiment, two positioning wedges 85 are used, and they are bonded vertically at the center portion of the left and right sides of the dust protection member 7R and the intermediate frame plate 81. When the wedges 85 are not bonded at suitable locations, heat deformation in the dust protection member 7R, the intermediate plate 81, or the wedges 85 may cause excess stress to be concentrated at the respective members. This may cause the wedges to fall off from the dust protection member 7R or the intermediate frame plate 81. However, when he wedges 85 are bonded to the left and right center portions, vertical deformation of the dust protection member 7R and the intermediate frame plate 81 can occur without restriction, with the wedges 85 as center. Therefore, it is possible to prevent, for example, undesired stress concentration and to prevent the wedges from falling off the dust protection member 7R as the restraint degrees of thermal deformation to these frame plates are low.

As can be seen from FIG. 11, each wedge 85 used in the embodiment has two blind holes 85c in the back face 85b thereof. These blind holes 85c are used as chucking engaging portions when the wedges 85 are chucked, using a jig, for use. Such blind holes 85c facilitate chucking of the wedges 85, making it easier to carry out mounting operations.

In the embodiment, blind holes 85c are formed as chucking engaging portions in the back face of each wedge 85. However, the chucking engaging portions may be formed in other component parts. For example, the chucking engaging portions, such as blind holes, may be formed in the outer surface of the dust protection member 7R.

Figure 12:
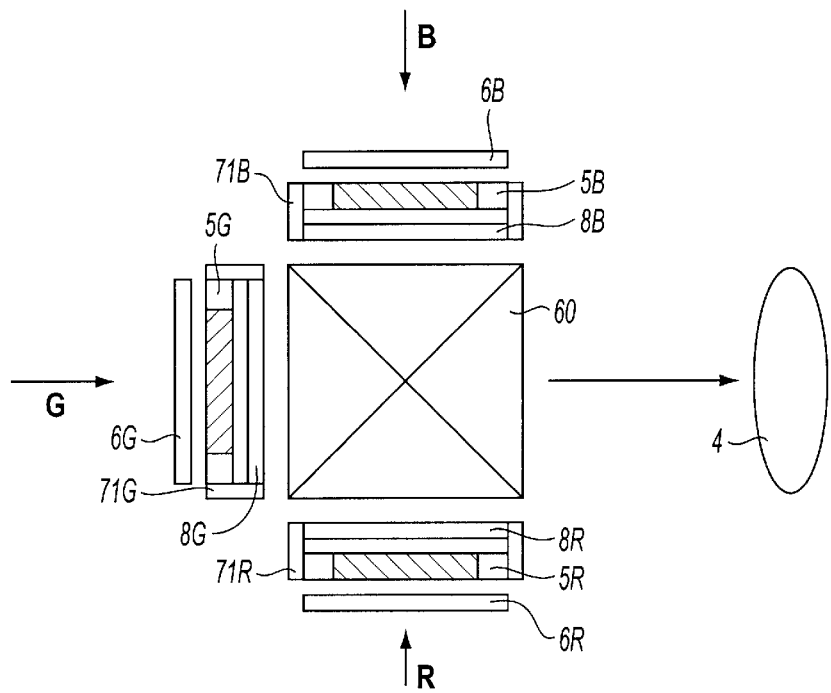
FIG. 12 is a plan view of an example which is different from that illustrated in FIG. 7.

In the projector 1, the dust protection member 7R supports the liquid crystal panel 5R and the polarizers 6R and 8R, and cuts off from the outside the area between the polarizer 6R and the light-incoming surface of the liquid crystal panel 5R as well as the area between the polarizer 8R and the light-outgoing surface of the liquid crystal panel 5R. In the case where only a very small amount of dust or the like is scattered at the light-incoming surface side of the liquid crystal panel 5R, a dust protection member 71R may be provided so as to support only the liquid crystal panel 5R and the polarizer 8R in order to cut off from the outside the area therebetween, as shown in FIG. 12. Obviously, dust protection members 71G and 71B, having the same structure as the dust protection member 71R, may also be used, respectively, so as to support the liquid crystal panel 5G and the polarizer 8G and the liquid crystal panel 5B and the polarizer 8B.

Figure 13:
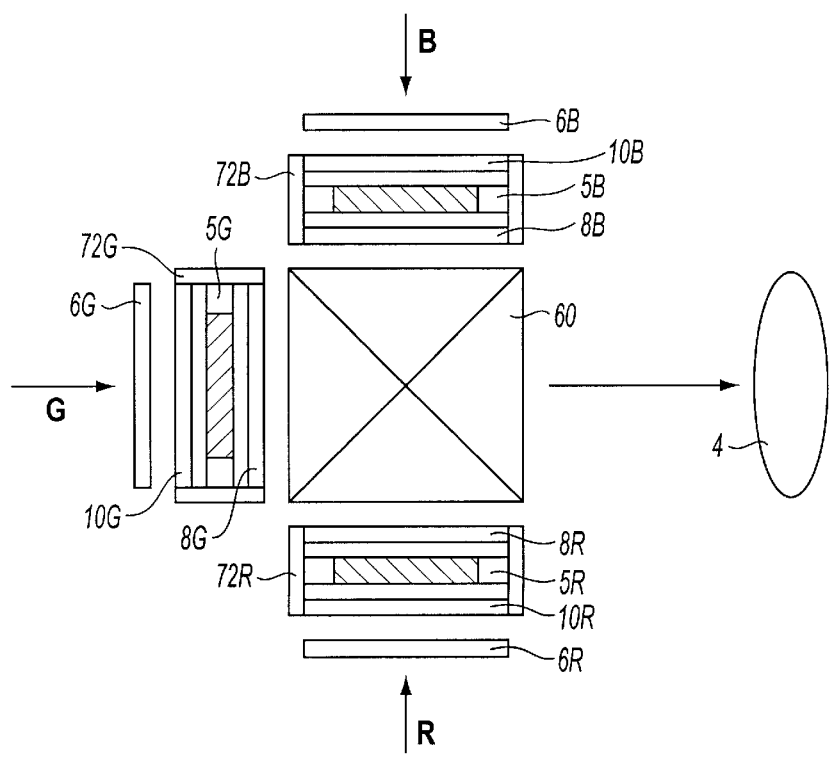
FIG. 13 is a plan view of an example which is different from that illustrated in FIG. 12.
Figure 14A:
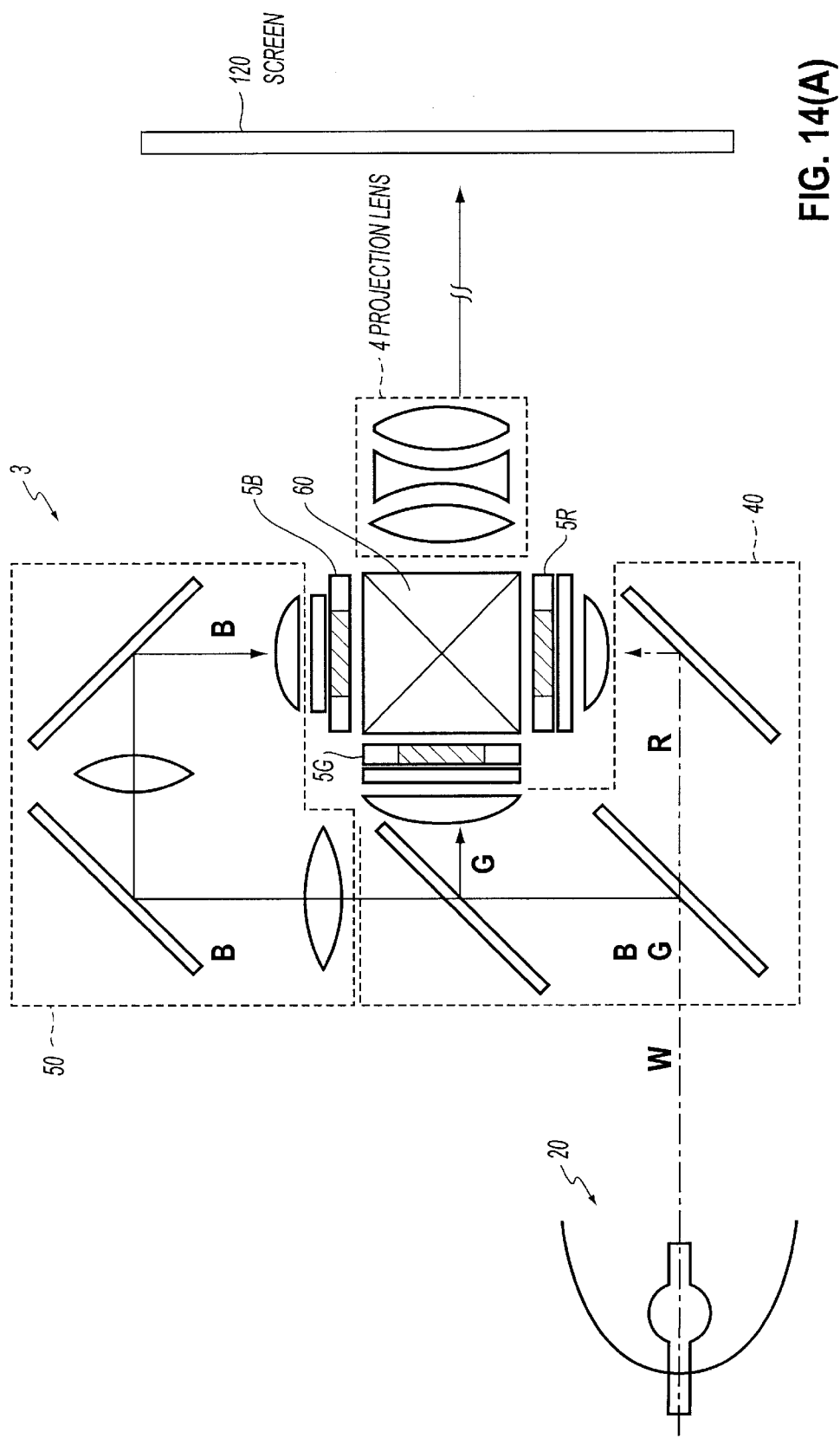

When there is a very large amount of heat generated at the polarizer 6R disposed adjacent to the light-incoming surface of the liquid crystal panel 5R, a transparent plate 10R, formed of, for example, glass or plastic, is disposed between the liquid crystal panel 5R and the polarizer 6R, as shown in FIG. 13. A dust protection member 72R supports the liquid crystal panel 5R, the polarizer 8R, and the transparent plate 10R, and cuts off from the outside the area between the polarizer 8R and the light-outgoing surface of the liquid crystal panel 5R as well as the area between the transparent plate 10R and the light-incoming surface of the liquid crystal panel 5R. Accordingly, an air layer as well as the transparent plate 10R are formed between the polarizer 6R and the liquid crystal panel 5R, so that the amount of heat generated at the polarizer 6R and transmitted to the liquid crystal panel 5R can be reduced by a greater amount, making it possible to reduce the amount by which the temperature of the liquid crystal panel rises by a greater amount. Obviously, transparent plates 10G and 10B, and dust protection members 72G and 72B, having the same structure as the dust protection member 72R, may be disposed at the liquid crystal panels 5G and 5B, respectively.

When dust or the like is very likely to stick onto the liquid crystal panel due to, for example, air currents produced in the device, the dust protection member may be provided so as to support the liquid crystal panel and only the polarizer adjacent to the light-incoming surface of the liquid crystal panel, and to cut off from the outside the area between the polarizer and the light-incoming surface of the liquid crystal panel. In other words, the dust protection member may be formed so as that it does not support the polarizer disposed at the light-outgoing surface side of the liquid crystal panel.

In the embodiment, the polarizers are formed of a material which passes one type of polarized light therethrough and absorbs the other type of polarized light, but the polarizers may be of the reflective type which reflects the other type of polarized light. The reflective type polarizer absorbs a small amount of light, and thus generates only a small amount of heat, so that it can reduce the amount by which the temperature rises at the liquid crystal panel due to heat generated at the polarizer. The reflective type polarizer reflects needless polarized light, so that when this type of polarizer is disposed at the light-outgoing surface side of the liquid crystal panel, the light reflected by the polarizer reaches the liquid crystal panel, and may cause the liquid crystal panel to malfunction. To ensure that the liquid crystal panel does not malfunction, it is preferable for the polarizer disposed adjacent to the light-incoming surface of the liquid crystal panel be a reflective type polarizer.

Although in the above-described embodiment a projector with three liquid crystal panels for modulating three colors, respectively, is described, the present invention is not limited thereto, so that the projector to which the present invention is applied may have, for example, two or more liquid crystal panels, or four or more liquid crystal panels.

As can be understood from the foregoing description, according to the projector of the present invention, a dust protection member is provided so as to cut off from the outside the area between the light-outgoing surfaces of the light-modulating elements and the corresponding polarizers disposed at the light-outgoing surface sides of the corresponding light-modulating elements. This results in the formation of an air layer between the light-outgoing surfaces of the light-modulating elements and the corresponding polarizers, so that compared to the case where a polarizer is directly mounted to the light-outgoing surface of a light-modulating element, the amount of heat generated at the polarizer and transmitted to the corresponding light-modulating elements can be reduced. Therefore, even when a polarizer with excellent selection characteristics is used to increase contrast of the projected image, it is possible to prevent deterioration in the optical characteristics of the light-modulating elements resulting from heat generated at the corresponding polarizers.

The air layer between the polarizers and the light-outgoing surfaces of the corresponding light-modulating elements is cut off from the outside, so that even when dust or the like is scattered due to the air currents produced in the device to cool the polarizer, the dust does not enter the air layer. Therefore, it is possible to prevent dust or the like from sticking onto the light-outgoing surfaces of the light-modulating elements.

Accordingly, the projector of the present invention can project a high quality image with excellent contrast, without deterioration in the optical characteristics of the light-modulating elements resulting from heat generated by the polarizers and without dirt sticking onto the light-outgoing surfaces of the light-modulating elements.

What is claimed is:

1. A projector comprising:
   a light source;
   a light-modulating element that modulates light emitted from the light source in accordance with image information;

a projecting device that projects the light modulated by the light-modulating element;

a first polarizer disposed adjacent to and separate from a light-outgoing surface of the light-modulating element;

a second polarizer disposed adjacent to and separate from a light-incoming surface of the light-modulating element; and a dust protection member that cuts off from an outside environment an area between the first polarizer and the light-outgoing surface and the second polarizer and the light-incoming surface, the dust protection member further comprising a first outside frame element, a second frame element, and a middle frame element disposed between and engaging with the first outside frame element and the second frame element, the first outside frame element and the second frame element sandwich the light modulating element, the first polarizer, and the second polarizer, the middle frame element surrounds an outer periphery of the light modulating element, the first polarizer, and the second polarizer.

2. The projector according to claim 1, the second polarizer being a reflective type polarizer.

3. The projector according claim 1, further comprising:

color separation elements that separate the light emitted from the light source into a plurality of color light beams;

a plurality of the light-modulating elements modulating the respective color light beams in accordance with image information;

a color synthesizer that synthesizes the respective color light beams modulated by the light-modulating elements;

the projecting device projecting the light synthesized by the color synthesizer, in enlarged form onto the projection surface; and the dust protection members supporting the corresponding light modulating elements and the corresponding polarizers, and being removably affixed to a light-incoming surface of the color synthesizer.

4. A projector comprising:

a light source;

a light-modulating element that modulates light emitted from the light source in accordance with image information;

a projecting device that projects the light modulated by the light-modulating element;

a polarizer disposed adjacent to and separate from a light-outgoing surface of the light modulating element;

a transparent plate disposed adjacent to and separate from a light-incoming surface of the light-modulating element; and a dust protection member that cuts off from an outside environment an area between the polarizer and the light-outgoing surface and the transparent plate and the light-incoming surface, the dust protection member further comprising a first outside frame element, a second frame element, and a middle frame element disposed between and engaging with the first outside frame element and the second frame element, the first outside frame element and the second frame element sandwich the light modulating element, the polarizer, and the transparent plate, the middle frame element surrounds an outer periphery of the light modulating element, the polarizer, and the transparent plate.

5. The projector according to claim 4, the second polarizer being a reflective type polarizer.

6. The projector according to claim 4, further comprising:

color separation elements that separate the light emitted from the light source into a plurality of color light beams;

a plurality of the light-modulating elements modulating the respective color light beams in accordance with image information;

a color synthesizer that synthesizes the respective color light beams modulated by the light-modulating elements;

the projecting device projecting the light synthesized by the color synthesizer, in enlarged form onto the projection surface; and the dust protection members supporting the corresponding light modulating elements and the corresponding polarizers, and being removably affixed to a light-incoming surface of the color synthesizer.

\* \* \* \* \*